United States Patent [19]
Moore

[11] Patent Number: 5,868,491
[45] Date of Patent: Feb. 9, 1999

[54] LAMP WITH MOVEABLE HOUSING SWITCH

[76] Inventor: Dennis G. Moore, 2602 Superior, Livermore, Calif. 94550

[21] Appl. No.: 876,959

[22] Filed: Jun. 17, 1997

[51] Int. Cl.[6] ...................................................... B60Q 3/02
[52] U.S. Cl. ........................... 362/295; 362/490; 362/546
[58] Field of Search ............................... 362/74, 80, 135, 362/136, 139, 141, 142, 155, 295, 394, 319, 277, 280, 490, 493, 512, 546

[56] References Cited

U.S. PATENT DOCUMENTS 3,671,739  6/1972  McCain ...................................... 362/74
4,884,179  11/1989  Moore ...................................... 362/295

*Primary Examiner*—Y My Quach
*Attorney, Agent, or Firm*—August E. Roehrig, Jr.; Hancock & Estabrook, LLP

[57] ABSTRACT

A lamp especially adapted for use in or on a vehicle, and having an "on-off" switch actuable by movement of the lamp housing to eliminate the necessity of a separate switch component in the illuminating circuit or lamp structure for operating the lamp. The movement of the lamp housing insures that the contacts through which the lamp is illuminated do not become permanently joined, and are cleaned to enhance the operational reliability of the lamp.

11 Claims, 2 Drawing Sheets

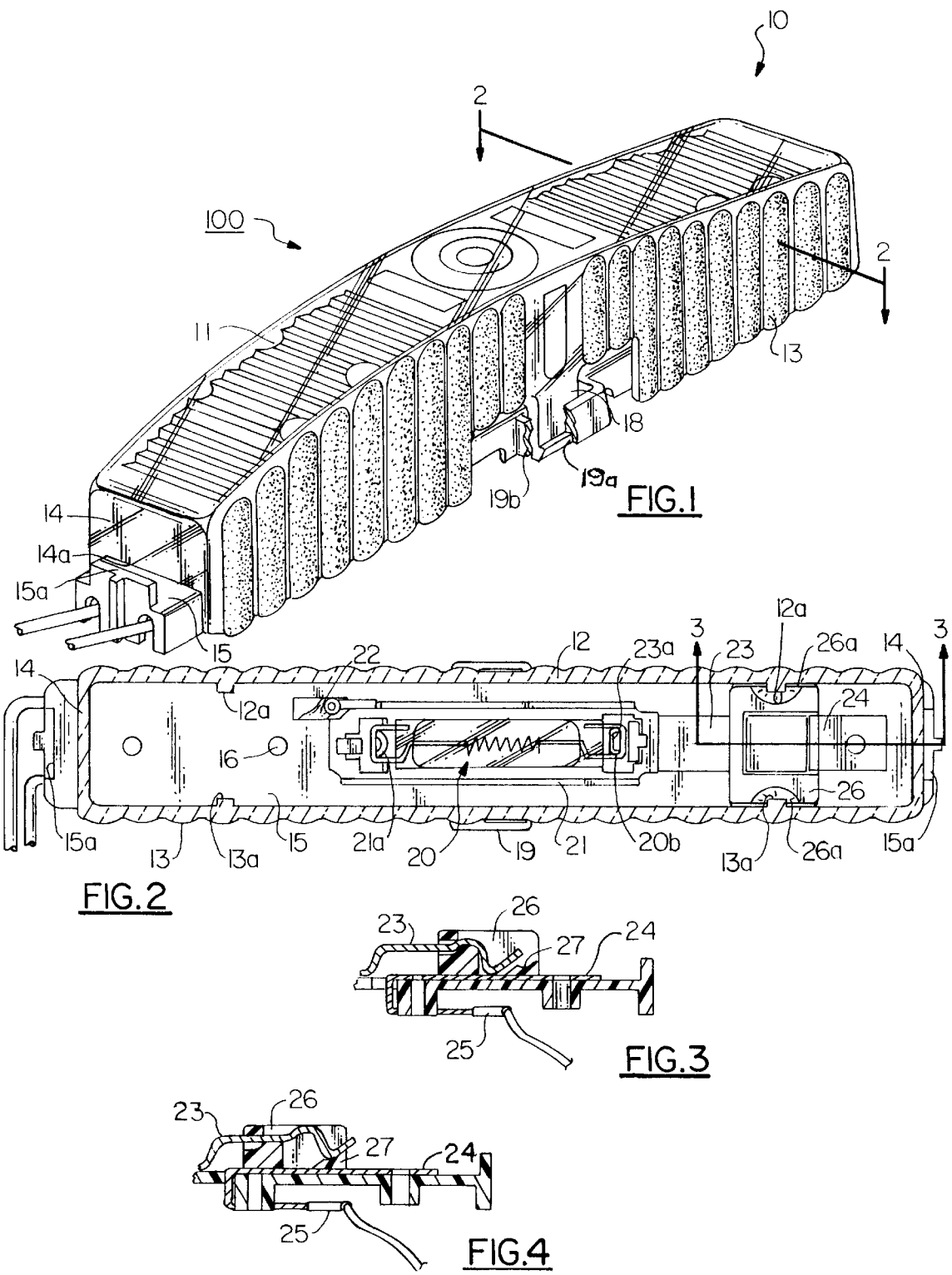

LAMP WITH MOVEABLE HOUSING SWITCH

BACKGROUND OF THE INVENTION

This invention relates in general to vehicle lighting and, in particular, to a lamp which functions as a courtesy lamp to provide a convenient source of lighting for use in or on a vehicle.

More specifically, but without restriction to the particular embodiment and/or use which is shown and described herein for purposes of illustration, this invention relates to a lamp especially adapted for use in or on a vehicle, and having an "on-off" switch actuable by movement of the lamp housing.

Courtesy lamps are used with vehicles to provide a source of light for convenience of the passengers or operator of the vehicle. Such a source of light is used for many purposes such as looking for articles dropped in the vehicle, reading maps, or personal grooming. Lamps used for this purpose are connected to the vehicle's electrical power supply and generally actuated by operation of a manual switch, which is a separate component of the lamp assembly.

In the inventor's prior patent, Dennis G. Moore, U.S. Pat. No. 4,884,179, "LAMP WITH BUILT-IN ON-OFF SWITCH", there is disclosed and claimed an electric lamp for use in a vehicle lighting system which eliminates the need for a separate control switch in the illuminating circuit, by incorporating the switching function into the lamp structure itself. In this patent the lamp bulb is positioned in a carrier which is moveable into and out from a position whereby the terminals of the lamp bulb itself engage and disengage electrical contacts carried within the lamp housing to thereby illuminate or extinguish the lamp.

The present invention also eliminates the need for a separate control switch component to be incorporated into the lamp illuminating circuit or lamp structure. In this invention sliding movement of the lamp housing itself, relative to the lamp base, opens and closes the illuminating circuit enabling the lamp to be conveniently operated without the necessity of looking or feeling for a switch actuator to turn the lamp on or off.

SUMMARY OF THE INVENTION

It is, therefore, an object of this invention to improve lamps for use on or in a vehicle.

Another object of this invention is to eliminate the necessity of a separate switching component in the illuminating circuit and structure of a vehicle lamp to control illumination of the lamp.

A further object of this invention is to utilize the movement of a lamp housing to control the illumination of the lamp.

Still another object of this invention is to utilize the movement of a lamp housing to insure that the separable lamp contacts do not become permanently joined.

Yet another object of this invention is to utilize the movement of a lamp housing to clean the lamp contacts for increasing the operational reliability of the lamp.

These and other objects are attained in accordance with the present invention wherein there is provided a lamp especially adapted for use in or on a vehicle, and having an "on-off" switch actuable by movement of the lamp housing to eliminate the necessity of a separate switch component in the illuminating circuit or lamp structure for operating the lamp. The movement of the lamp housing insures that the contacts through which the lamp is illuminated do not become permanently joined, and are cleaned to enhance the operational reliability of the lamp.

DESCRIPTION OF THE DRAWING

Further objects of this invention, together with additional features contributing thereto and advantages accruing therefrom, will be apparent from the following description of a preferred embodiment of the invention which is shown in the accompanying drawings with like reference numerals indicating corresponding parts throughout and which is to be read in conjunction with the following drawings, wherein:

FIG. 1 is a perspective view of the invention;

FIG. 2 is a top elevational view of the lamp illustrated in FIG. 1 taken through the lamp housing as illustrated by lines 2—2;

FIG. 3 is a sectional view of the lamp illustrated in FIG. 2 taken along lines 3—3 to better illustrate the structure through which illumination of the lamp is controlled;

FIG. 4 is a sectional view of the lamp illustrated in FIG. 2 similar to that of FIG. 3 to better illustrate the structure through which illumination of the lamp is controlled;

DESCRIPTION OF A PREFERRED EMBODIMENT

Figures 5, 6:
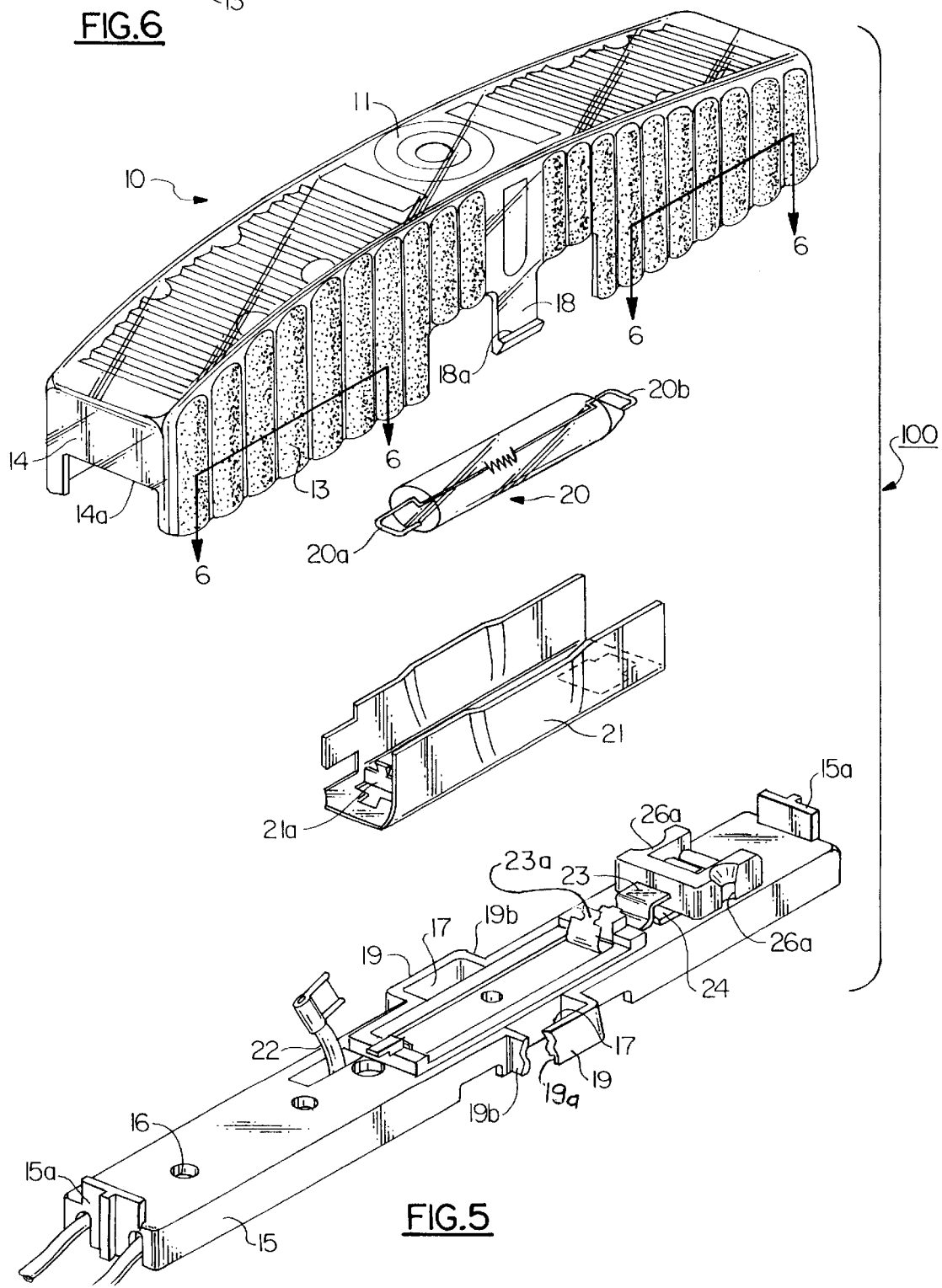
FIG. 5 is an exploded view of the lamp of this invention to better illustrate the components thereof.
FIG. 6 is a partial sectional view of the lamp housing taken along lines 6—6.

Referring now to FIGS. 1, 2 and 3, there is illustrated a lamp 100 which is especially adapted for use in or on a vehicle. The lamp 100 includes a housing 10 having lenses through which light is emitted when a bulb 20 is energized. The housing 10 includes a transparent or translucent front wall 11, top wall 12, bottom wall 13 and two oppositely disposed end walls 14. An opaque lamp base 15, to which the transparent or translucent housing 10 is releasably secured, completes the enclosure of the lamp interior.

The lamp 100 is securable to the interior of a vehicle by means of screws or other suitable fasteners, not shown, passing through holes 16 formed in the lamp base 15. The housing 10 is secured to the lamp base 15 by means of a pair of resilient tabs 18, each formed by a portion of the top and bottom walls 12 and 13, respectively, passing through openings 17 formed in the lamp base 15. A lip portion 18a, formed on the distal end of each of the tabs 18, engages a stepped portion 19a of a wall 19, which defines in part one of the opening 17 in the lamp base, to releasably retain the housing 10 on the base 15.

To provide a source of illumination, the lamp bulb 20 is carried on the lamp base 15 in a reflector 21 formed from electrically conductive material. The reflector 21 positions the lamp bulb 20 in optical alignment with the lenses formed in the front 11, top 12 and bottom 13 walls of the housing 10 to emit light therethrough.

One of the electrical terminals 20a of the lamp bulb 20 is connected to a terminal 21a formed on the reflector 21 to physically and electrically connect the lamp bulb 20 to the reflector 21 in the desired position. The reflector 21 is secured to the lamp base 15, made of an electrically insulating or non-conducting material, with an electrical lead 22 coupled thereto to electrically connect the reflector 21 and the terminal 20a of the lamp bulb 20 into the illuminating circuit for the vehicle.

The other terminal 20b of the lamp bulb 20 is connected to the distal end 23a of a first flat strip conductor 23 which, in cooperation with a second flat strip conductor 24 connected by an electrical lead 25 to the illuminating circuit of the vehicle, functions to control the electrical power supplied to the bulb 20 in response to movement of a slider 26. Movement of the slider 26 in the direction of the longitudinal axis of the lamp 100, toward or away from the two opposed end walls 14, will energize or extinguish the lamp 20 by permitting contact, or separating contact, between the two strips 23 and 24.

As best illustrated in FIG. 3, the first conductor 23 is shaped to spring bias the strip into a position for engaging the second conductor 24 to complete the power circuit for illuminating the lamp bulb 20. Upon movement of the slider 26 from the position illustrated in FIG. 3 to the position illustrated in FIG. 4, the first conductor 23 is cammed or wedged out from contact with the second conductor 24. The wedging or camming action of a ramp portion 27 of the slider 26 engages the first conductor 23 to raise the first conductor 23 out from contact with the second conductor 24 upon movement of the slider towards the lamp bulb 20. In this manner, the wedging action of the slider ramp 27 separates the two conductors to insure that they can not become "welded" together, such as might occur in the event of a short in the circuit. In addition, the wiping movement of the slider 26 moving over the conductor or contact 24 scrubs the contacting surface to remove any oxide or corrosion thereby enhancing the reliability of the circuit operation.

Movement of the slider 26, for opening and closing the power supply to the lamp bulb 20, is effected by movement of the housing 10 relative to the lamp base 15 in a direction along the longitudinal axis of the lamp. To this end, the lamp base 15 is of a width to fit within the rear open portion of the housing 10, and is of a length which exceeds the length of the housing 10 extending through openings 14a formed in each end wall 14. The resilient tabs 18 which extend into the openings 17 formed in the lamp base 15 also function as guides for this movement. Stops 15a, formed at each end of the lamp base 15, in cooperation with terminal ends 19b of wall 19, limit the amount of movement of the housing 10 relative to the lamp base 15.

The slider 26 is connected to the housing 10 for movement therewith by a pair of protrusions 12a and 13a, best illustrated in FIGS. 2 and 6, formed on the interior of the top and bottom walls 12 and 13, respectively. When the housing 10 is assembled onto the lamp base 15, the protrusions 12a and 13a engage complementary recesses 26a formed on the sides of the slider 20 adjacent to the top and bottom walls. In this manner the sliding movement of the housing 10 relative to the lamp base 15 will cause a corresponding sliding movement of the slider 26 for controlling the electrical power supplied to the lamp bulb 20. To facilitate assembly of the lamp 100, two pairs of protrusions 12a and 13a are formed in the housing 10, with, one pair adjacent to each end thereof so that the housing 10 does not require a particular orientation relative to the lamp base 15 for proper assembly.

While this invention has been described in the specification and illustrated in the drawings with reference to a preferred embodiment, the structure of which has been disclosed herein, it will be understood by those skilled in the art to which this invention pertains that various changes may be made and equivalents may be substituted for elements of the invention without departing from the scope of the claims. Therefore, it is intended that the invention not be limited to the particular embodiment disclosed in the specification and shown in the drawings as the best mode presently known by the inventor for carrying out this invention, nor confined to the details set forth, but that the invention will include all embodiments, modifications and changes as may come within the scope of the following claims:

What is claimed is:

1. A lamp for use with a vehicle to provide a source of illumination comprising
    a housing having a light transmitting portion through which light is passed when a lamp bulb positioned within said housing is illuminated,
    said housing having an opening therein through which the lamp base is received for positioning the lamp bulb relative to said light transmitting portion of said housing and substantially closing said housing,
    said lamp base adapted to retain the lamp bulb and position the lamp bulb within said housing,
    said lamp base including a slider actuable by movement of said housing relative to said lamp base for controlling the illumination of the lamp bulb carried by said lamp base.

2. The lamp of claim 1 wherein said slider is actuable to control the illumination of the lamp bulb carried by said lamp base by movement of said housing relative to said lamp base in a path of movement along an axis longitudinal to said lamp base.

3. The lamp of claim 2 wherein said housing includes at least one slider engaging protrusion on each of the interior walls of the housing for engagement with said slider to effect movement of said slider with movement of said housing along an axis longitudinal to said lamp base.

4. The lamp of claim 3 further including a stop positioned at each end of said lamp base to limit the movement of said housing relative to said lamp base.

5. The lamp of claim 1 wherein said lamp base includes a reflector retaining the lamp bulb in a predetermined position relative to said light transmitting portion of said housing and coupling a first electrical terminal of the lamp bulb retained therein thereto.

6. The lamp of claim 5 further including a first electrical conductor carried by said lamp base for coupling to a second electrical terminal of the lamp bulb retained by said reflector,
    said first electrical conductor having a free end thereof carried by said slider for movement to complete a lamp bulb illuminating circuit in response to movement of said slider,
    a second electrical conductor carried by said lamp base for connection to a source of illuminating power,
    said second electrical conductor positioned adjacent to the free end of said first electrical conductor for coupling thereto in response to the positioning of said slider.

7. The lamp of claim 6 wherein said slider includes a ramp portion for engaging said free end of said first electrical conductor to separate said first electrical conductor from contact with said second electrical conductor.

8. The lamp of claim 6 wherein said slider contacts a surface of said second electrical conductor during movement of said housing for effecting cleaning of the contacting surface between said first and second electrical conductors.

9. The lamp of claim 1 wherein said housing includes resilient tabs, each of said resilient tabs engaging a portion of said lamp base to releasably secure said housing to said lamp base.

10. The lamp of claim 9 wherein said lamp base includes openings for receiving said resilient tabs of said housing to releasably secure said housing to said lamp base and to guide the movement of said housing relative to said lamp base.

11. The lamp of claim 1 further including means for securing the lamp to a supporting surface.

* * * * *

UNITED STATES PATENT AND TRADEMARK OFFICE
CERTIFICATE OF CORRECTION

PATENT NO. : 5,868,491
DATED : 2/9/1999
INVENTOR(S) : Moore

It is certified that error appears in the above-identified patent and that said Letters Patent is hereby corrected as shown below:

In The Claims:

Claim 1, line 6 "the" should be --a-- before lamp base.

Signed and Sealed this

Eighth Day of May, 2001

Attest:

NICHOLAS P. GODICI

Attesting Officer     Acting Director of the United States Patent and Trademark Office